United States Patent [19]

Gustavsson et al.

[11] 4,393,747
[45] Jul. 19, 1983

[54] LOADING TABLE

[75] Inventors: Olle Gustavsson; Göran Sundmar, both of Karlskoga, Sweden

[73] Assignee: Aktiebolaget Bofors, Bofors, Sweden

[21] Appl. No.: 217,635

[22] Filed: Dec. 18, 1980

[30] Foreign Application Priority Data

Dec. 18, 1979 [SE] Sweden ............................ 7910436

[51] Int. Cl.³ ............................................. F41F 9/02
[52] U.S. Cl. ........................................ 89/45; 198/654
[58] Field of Search ................. 89/33 BC, 33 CA, 45, 89/47; 198/654, 456

[56] References Cited

U.S. PATENT DOCUMENTS

| | | | |
|---|---|---|---|
| 1,136,695 | 4/1915 | Miclaus | 89/33 BC |
| 2,460,384 | 2/1949 | Haas | 89/33 BC |
| 3,937,125 | 2/1976 | Eriksson | 89/45 |
| 4,041,822 | 8/1977 | Gabel | 198/654 |
| 4,044,649 | 8/1977 | Wilder | 89/33 BB |

Primary Examiner—Stephen C. Bentley
Attorney, Agent, or Firm—Pollock, Vande Sande & Priddy

[57] ABSTRACT

A loading table including a stable frame with a flat depositing plane (13) for shells (14) lying beside each other and feeding means for removing the shells, one at a time, from the plane, through lateral displacement. The feeding means utilize holding trough segments arranged in an endless chain with two stories of which the upper story comes into connection with the depositing plane. The segments are fastened in the links (16) of two drive chains which by means of the step drive mechanism can be actuated so that at a certain actuation of the step drive mechanism, holding troughs (15) for the shells, which can be composed of holding trough segments in the upper story, are moved forwards one spacing distance. The pairs of holding trough segments are arranged in such a way that said holding troughs which are formed are capable of receiving new shells directly from above under parallel displacement substantially at right angles to the depositing plane in a number corresponding to the number of shells removed from the plane. The holding troughs can then receive two or more shells simultaneously when these are arranged parallel to each other.

8 Claims, 13 Drawing Figures

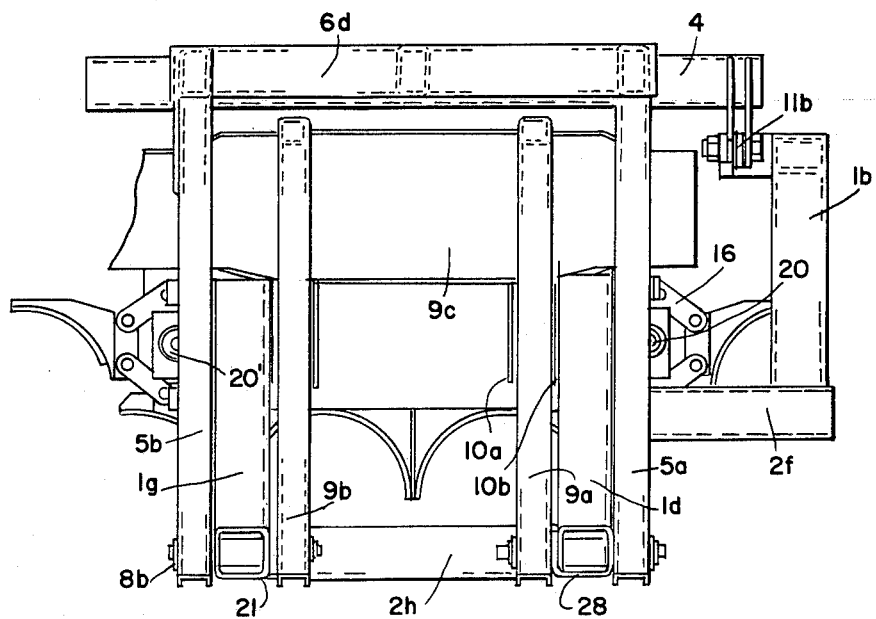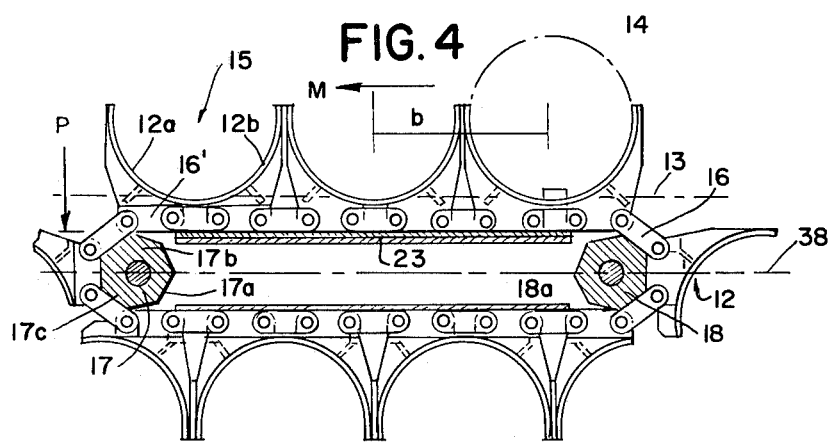

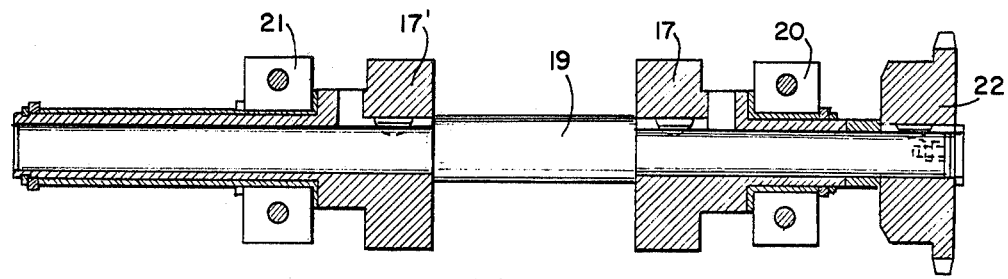
FIG. 6
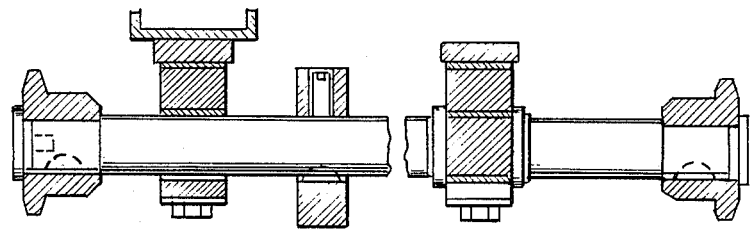
FIG. 7
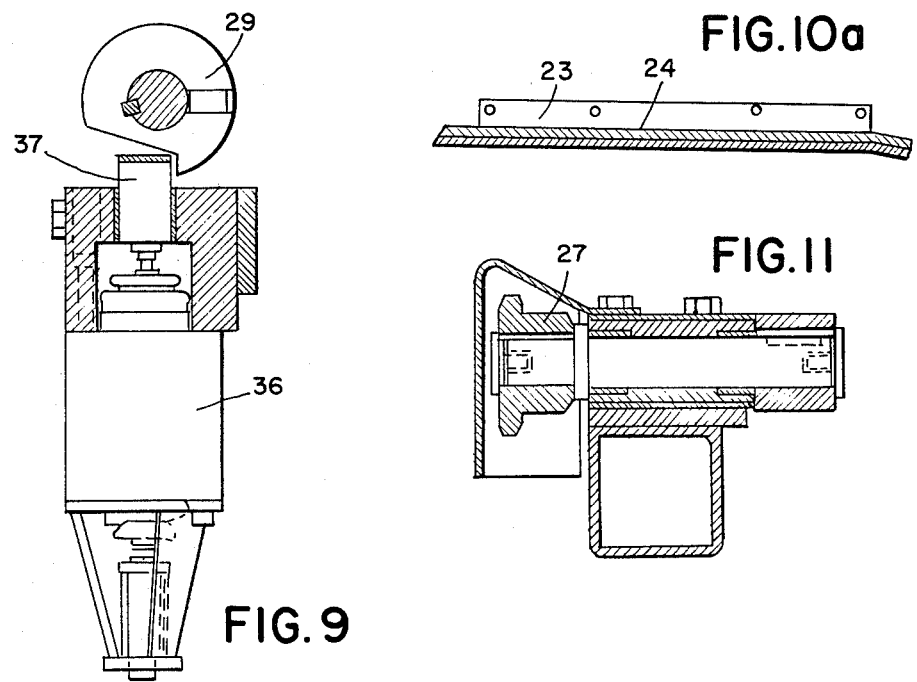
FIG. 10a
FIG. 11
FIG. 9

LOADING TABLE

TECHNICAL FIELD

The present invention relates to a loading table comprising a stable frame with a substantially flat depositing plane for units of ammunition, e.g. shells lying beside each other and with feeding means allotted to the units which in dependence on actuations displace the units laterally in the plane and remove them, one at a time.

The new loading table is intended to be mounted on artillery pieces of various kinds, such as a field howitzer which can be driven.

BACKGROUND ART

A number of loading tables for firearms of the aforementioned type are previously known, and of these may be mentioned a loading table which has a depositing plane for the shells and on which the shells can roll on the depositing plane owing to the inclination of the plane towards the removal position and under the control of a step drive mechanism.

For loading tables it is also previously known to utilize holding troughs in which the ammunition units in question can be applied and fed forwards.

For e.g. a field howitzer, however, there is a need for a technically simple loading table, which requires little space but from the point of view of functioning shall be capable of permitting effective depositing of the ammunition units by means of a loading cassette or the like. Thus, it shall be possible to deposit a plurality of ammunition units simultaneously in dependence on how the feed from the loading table progresses. It shall be possible to lift a predetermined number of units simultaneously to the loading table, which number in the present case has been chosen to be a maximum of three. However, receiving of only one ammunition unit or two ammunition units at a time may take place. Units of one kind are received in the respective lift for depositing, but the receiving of units of different kinds in the same lift can occur. On loading tables of this type there is also a requirement that the ammunition units in their applied positions shall be effectively secured against actuations from the recoiling parts in connection with firing.

It is difficult for the previously known loading tables to fulfil these requirements, and it is therefore a main purpose of the present invention to replace the known loading tables within the identified field of use. The principle of rolling cannot be used for an ammunition unit which has front guiding cleats instead of a front guide surface, which poses problems in maintaining the rolling direction from the table.

SUMMARY OF THE INVENTION

A feature for a loading table according to the invention is that its feeding means comprises a number of holding trough segments arranged in an endless chain in two stories, of which the upper story is located with said depositing plane. The holding trough segments can be put together in pairs in the plane so that a respective pair forms a holding trough for a unit. The holding trough segments are fastened in at least one drive chain also comprised in the feeding means and which can be actuated with a step drive mechanism belonging to the driving means. Each actuation move the holding trough segments forwards a distance corresponding to a spacing distance between two holding troughs. In the respective step forwards the position of all the holding trough segments in the holding troughs formed in the upper storey are in the depositing plane. The holding trough segments are arranged so that the holding troughs are capable of receiving new units directly from above during parallel displacement substantially at right angles to the depositing plane in a number corresponding to the number of units removed from the plane and to receive two or more units simultaneously when they are arranged parallel to each other. In further developments of the invention further details are proposed of the design of the holding trough segments of the loading table and the drive chains with sprocket wheels. Further, means are proposed of achieving the securing function for the ammunition units when these are applied in the holding troughs.

However, the features that can mainly be considered to be characteristic for a loading table according to the invention will be noted from the claims following.

Through the proposed invention an effectively functioning loading table is obtained, on which shells of various lengths and forms can be placed, transported, and removed. The loading table also permits the shells to be applied by means of a cassette or the like. The fixing of the shells to the loading table during the recoiling movements of the firearm is also effective, and does not interfere with the normal functions of the loading table. The table can receive various kinds of ammunition which varies as to the distance between the rear end and the driving band. The new table can also receive shells which have guiding cleats instead of front guiding means.

BRIEF DESCRIPTION OF DRAWINGS

An embodiment proposed at present of a loading table which has the characteristics significant for the invention will be described in the following, with reference to the accompanying drawings, in which FIG. 1 in a view from above shows the new loading table, FIG. 2 in a side view shows the loading table according to FIG. 1, FIG. 3 from one end shows the loading table according to FIGS. 1 and 2, FIG. 4 shows the feeding means for shells or corresponding ammunition units in the loading table according to FIGS. 1-3, FIG. 5 in cross-section and along section A—A in FIG. 2 shows supporting arrangements for a clamping bar comprised in the loading table, FIG. 6 in cross-section and along the section B—B in FIG. 2 shows the supporting arrangement for the sprocket wheels comprised in the feeding means, FIG. 7 in cross-section and along the section C—C in FIG. 2 shows the supporting arrangement for a shaft comprised in a step driven mechanism, FIG. 8 in cross-section and along the section D—D in FIG. 2 shows a first part in the step drive mechanism, FIG. 9 partly in cross-section and along the section E—E in FIG. 1 shows further parts of the step drive mechanism, FIG. 10 in cross-section and along the section F—F in FIG. 2 shows slide guides for links comprised in the drive chains belonging to said step drive mechanism, FIG. 10a partly in cross-section and along section I—I in FIG. 10 shows a slide guide in detail, FIG. 11 in cross-section and enlarged in relation to FIG. 2 shows the support for a hand crank utilized in the step drive mechanism, and FIG. 12 in a view along the section J—J in FIG. 2 shows the securing device for the hand crank shown in connection with FIG. 11.

BEST MODE OF CARRYING OUT THE INVENTION

Figure 1:
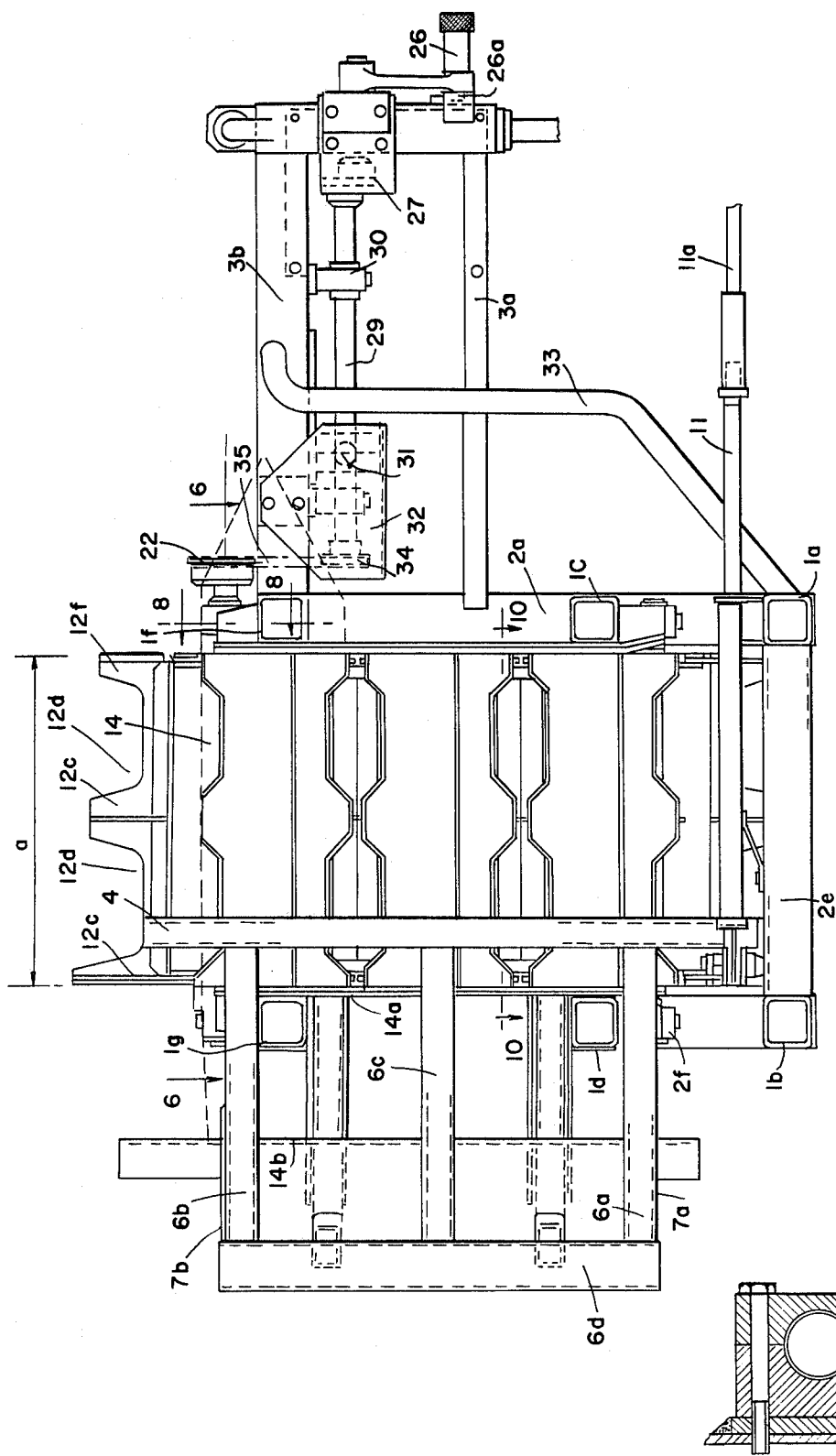
Figure 2:
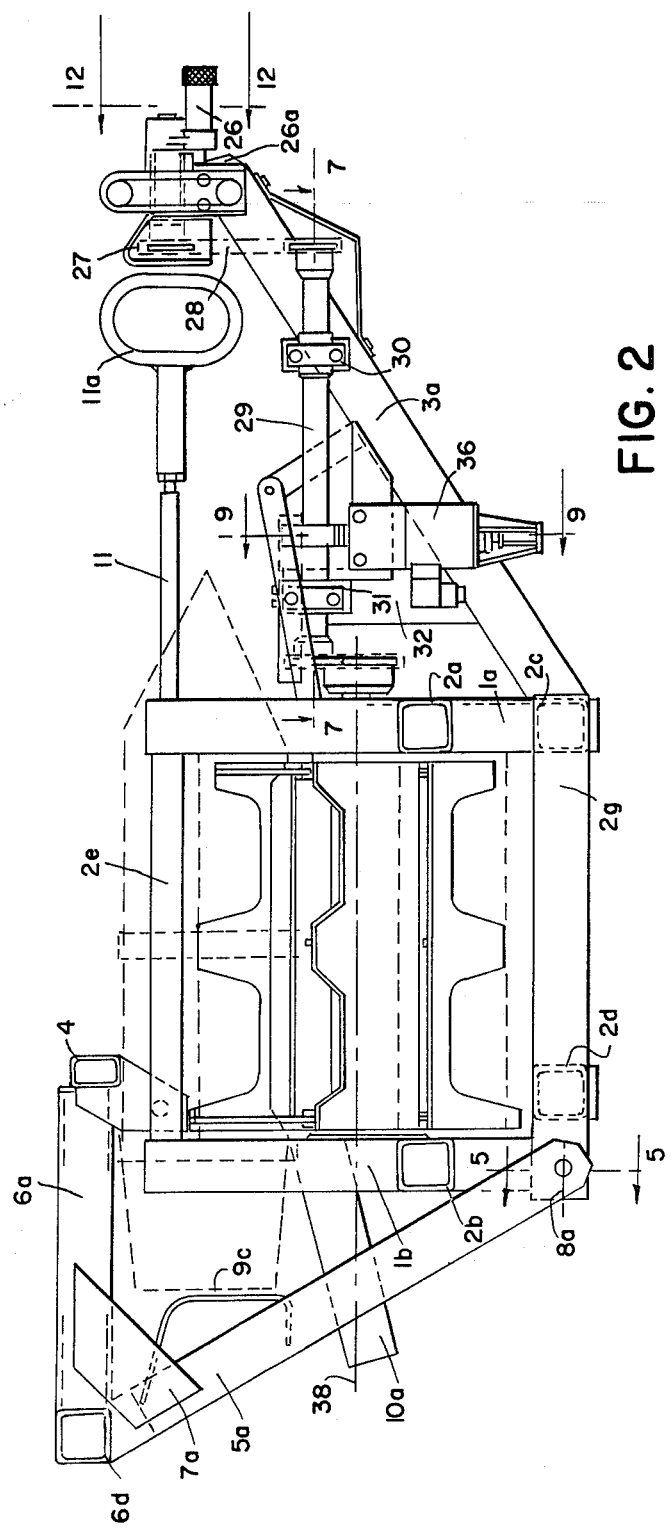
Figure 5:
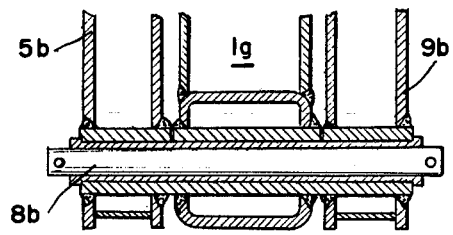

In accordance with FIGS. 1–3 the new loading table comprises a stable frame with a number of vertically arranged beams 1a-1g and a number of horizontally arranged beams 2a-2i. The frame comprises two beams 3a, 3b, extending straight forwards from the lower parts of the frame and directed obliquely upwards, of which one of the beams 3a is fastened at the middle part of a lower horizontal beam 2a and the other beam 3b is fastened to a lower front corner formed by the beams 2c and 1f. The free ends of the beams 3a and 3b are on a level with the upper parts of the frame.

At the rear parts of the frame, on the two lower horizontal beams 2g and 2i a first unit is rotatably supported which supports a horizontally arranged clamping bar 4 which is lowerable and removable from the loading table by means of the unit. The first unit comprises a first frame part with beams 5a, 5b, and a second frame part which is set at an angle in relation to the first frame part, and which has the beams 6a-6d, the clamping bar 4 then being connected to the free ends of the beams 6a, 6b, and 6c. Positioning elements 7a and 7b fix the first and second frame parts to each other. The rotatable support for the first unit is indicated by 8a and 8b, and consists, in principle, of a journal support.

On the same rotatable supports 8a and 8b, but individually adjustable in relation to said first unit, there is also a second unit, rotatably supported. The second unit has beams 9a and 9b for a part 9c in the form of a plate which has a flat surface 9c'. The beams 9a and 9b are guided by means of guide elements 10a, 10b, at which securing means not shown are arranged, to secure the second unit in various desired angular positions.

The first unit with the clamping bar 4 can be actuated by means of an operating rod 11, which has a handle 11a. The rod is supported at the upper ends of the vertical beams 1a and 1b so that it can be displaced in its longitudinal direction. The free end of the rod has a rotatable support 11b, via which the clamping part is connected, in order to enable the actuation movements of the first unit.

As will be noted from, inter alia, FIG. 4, the loading table is provided with a number of holding trough segments 12, arranged in an endless chain. The chain is arranged in two stories, of which the upper one is in connection with a straight depositing plane 13 for a number of ammunition units, e.g. in the form of shells 14. In the example of the embodiment the loading table is arranged to be capable of receiving a total of three shells simultaneously. It is then characteristic for the loading table that it works with holding troughs 15 for the shells, the respective holding trough then being intended to receive one ammunition unit.

The holding troughs are formed in the upper story by the holding trough segments assembling in pairs so that a respective pair forms a holding trough. The holding trough segments in the respective pair are then unsymmetrical in relation to each other in the cross-section according to FIG. 4. The holding trough segments in the respective pair substantially form a semicircle in the cross-sections. The segment located farthest to the front in the feeding direction M then has an arc length which is greater than the arc length of the rear segment. The straight depositing plane 13 for the shells 14 can be considered to be tangent internally to all of the holding troughs formed in said upper story.

The holding trough segments are fastened at the bottom to links 16 which are connected together in an endless drive chain, in accordance with FIG. 4. Two such drive chains are arranged at the loading table, of which, however, only one drive chain is shown in the figures. The holding trough segments have a length a and the drive chains are arranged at the ends of the respective holding trough segments. The two drive chains comprise two sprocket wheels 17, 18, for the respective drive chain. The sprocket wheels at the ends of the respective drive chain are supported on the same shaft, in accordance with FIG. 6, which shows the front pair of sprocket wheels 17, 17' which form the driving wheels in the drive chains. The sprocket wheels and shaft are rotatably supported in the frame via ball bearings 20, 21. See also FIG. 3, which shows the fastening arrangements for the ball bearings 20 and 20' for one and the same drive chain. One end of the shaft 19 is applied in a drive wheel 22 described in the following, which is comprised in a step drive mechanism for the drive chains.

Figure 10:
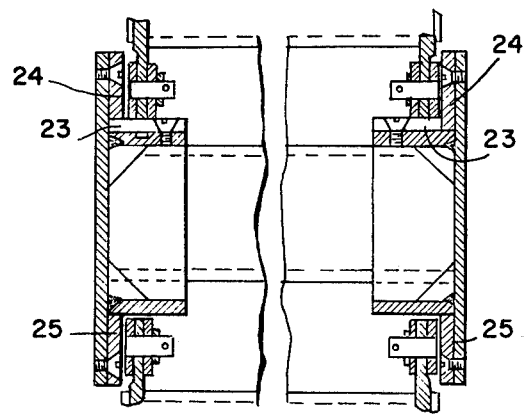

The sprocket wheels 17, 18 coact with the links 16 of the respective drive chain via straight actuating surfaces 17a and 18a, respectively. Thus, in its cross-section shown in FIG. 4, the respective chain wheel has the form of a polygon. In the example of the embodiment with three holding troughs in the straight depositing plane and step movements with a spacing distance b between the holding troughs for each actuation, the sprocket wheels have been given the form of a heptagon. This design is particularly favourable owing to its unsymmetrical meshing with the links in the respective drive chain. The unsymmetrical meshing results in the chain tension being kept substantially constant in the respective drive chain during the step movement. If the corner 17b of the sprocket wheel 17 is considered, it will be noted that at clockwise rotation it will mesh with the link 16' in question, and in its uppermost position it would strive to stretch the drive chain. At the same time, however, the corner 17c leaves its lowest point, and a corresponding slackening function arises, etc. During the driving of the chain, the links 16 in the respective drive chain slide along a horizontal slide rail 23 (FIG. 4) which moreover in accordance with FIGS. 10 and 10a is set at an angle with a side support rail 24 which supports the chain links on the outsides. A slide rail 25 corresponding to said side support rail is also arranged in the lower story of the chain.

Figure 12:
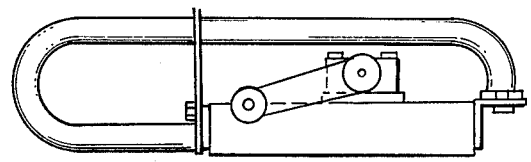

The holding trough segments are driven via the relevent sprocket wheel, and the drive chain manually by means of a step drive mechanism which comprises, the hand wheel 26 shown in FIG. 1, the step drive mechanism being arranged so that one turn of the crank corresponds to a step of one spacing distance b (FIG. 4). As will be noted from FIG. 2, the crank 26 is provided with a stop pin 26a which defines the starting position. The support for the hand wheel at the free ends of the frame beams 3a and 3b is shown in FIGS. 2 and 12. The hand wheel is in connection with a drive wheel, see also FIG. 11, which in an enlarged view and in cross-section shows the shaft support for the hand wheel and said wheel 26. Via a belt or chain 28 the wheel 27 is in connection with an elongate rotatable shaft 29 supported in brackets 30 and 31 on the beam 3b and on a built out part 32 of said beam 3a. The built out part 32 is also supported by a transversal element 33 in the frame, which extends from the middle parts of the vertical beam 1a to the middle parts of the beam 3b. The inner end of the rod 29 has a sprocket wheel 34 which via a chain 35 drives the drive wheel 22 mentioned above which actuates the shaft 19 and therewith the sprocket wheels 17, 17'. The bearing bracket for the bearing 20 is shown in FIG. 8.

In order to prevent undue movements of the step drive mechanism, the rotatable shaft 29 act with a blocking mechanism according to FIG. 9. The mechanism comprises an electromagnet 36, which is known in itself, which is controlled electrically by the recoiling parts of a firearm, at which the loading table is intended to be used. The electromagnet actuates a blocking plunger 37 which in the unactuated position of the magnet is engaged with a cleat on the shaft 29, and thereby prevents the shaft from being further turned. In the actuated position of the magnet, the blocking plunger is released from the shaft, and permits it to be turned. As regards the design of the holding troughs formed by the pairs of holding trough segments, the holding troughs are pulled over the center at the rear edge 12c. The rear edge is intended to coact with the front edge of a driving band 14a located on the shell in question or the like. The respective holding trough segments are made with side recesses 12d which extend under the center (applicable to the cross-section) which extend up to the center with their middle and front parts with sections 12e and 12f, respectively. Through the side recesses, the holding troughs form compound recesses, viewed from above. The holding troughs which are thus open from straight above permit the shells to be deposited in the holding troughs directly from above, i.e. under parallel displacement of the respective shell at right angles (see arrow P in FIG. 4) towards the depositing plane 13. The compound side recesses then permit application of the shells on the table by means of a cassette, and the compound side recesses then enable gripping means on the cassette to be inserted between the holding troughs and released when the respective shell has reached its position in the respective holding trough. With the cassette more than one shell can be applied simultaneously to the table, and the cassette, in addition to the parallel displacement of the shell, also keeps the shells oriented in space so that they are in a horizontal position and parallel to each other. The cassette is arranged so that, like the loading table, it can support three ammunition units. When depositing one or two shells on the table from the cassette, this can take place if the cassette has the same number of shells as there are empty holding troughs. The empty holding troughs should then be farthest towards the outside of the loading table, i.e. at the beam 2e and the rod 11, which makes is possible to insert an empty compartment in the cassette over the beam 2e and the rod 11.

The loading table is fastened or can be fastened to the artillery piece in question, e.g. a field howitzer, via e.g. the vertical beams 1a, 1b, 1f, and 1g.

The loading table described above functions in the following way. In order to enable the application of the shells, the clamping bar 4 is swung over rearwards through manual longitudinal displacement rearwards of the rod 11, and the first and second units with beams 5a, 5b, and 6a-6d are then swung over rearwards and therewith the clamping bar 4. The number of shells in question are lowered horizontally and parallel to each other by means of a cassette or the like at right angles to the depositing plane 13. When the shells have assumed their positions in the holding troughs, the rear edges 12c of these, through coaction with the front edges of the driving bands 14a of the shells, prevent the shells from being displaced forwards in connection with the subsequent recoil movements of the firearm. Movements directed rearwards of the shell are prevented by the plate 9c, the surface 9c' of which is located at the rear end 14b of the shells. With the suspension of the plate 9c being adjustable in relation to the suspension of the clamping bar, the plate can be set for different distances between the driving band and the rear end of the shells, i.e. the loading table can be used for shells of various types. The suspension beams 9a and 9b for the plate, in accordance with the above, are arranged so that they can be secured to the guide elements 10a and 10b for securing the plate in a position where its surface is located just behind the rear end of the shells. The securing means can then consist of a clamping device of a kind which is known in itself.

When the shells have been applied and the cassette has been removed, the clamping bar 4 is swung back by means of the rod 11. The distance between the underside of the clamping bar and the upper parts of the shells has been chosen with comparatively little play, and the shells are thereby fixed also as regards to movements directed upwards in connection with the recoiling movement of the firearm. However, the play is chosen so that the lateral displacement of the shells between the recoiling actions is not prevented.

In order to remove one shell at a time from the loading table to a loading tray, not shown, or the like, the hand crank shall be actuated one turn. The hand crank is pulled outwards to release the catch 26a and can thereafter be turned one turn, provided that the blocking magnet 36 has received an all-clear signal from the loading system in front of it, and has retracted its blocking device 37. The movements of the hand crank are transferred via the wheel 27, the chain 28, the rotatable shaft 29, the wheel 34, the chain 35, and the drive wheel 22 to the shaft 19 and therewith the sprocket wheels 17 and 17' for the two drive chains. The chains are stepped forwards one spacing b, which involves that the holding trough segments which form the front holding trough on the table are successively tipped down at the front ends of the chain. Because of the extended arc form of the front holding trough segment, a long supported depositing movement for the shell in question takes place. It is only when the holding trough segment has been tipped down to a level with the center line 38 (FIG. 4) of the chain that the actual depositing of the shell down into a loading tray or the like, not shown, takes place. The following rear holding trough segment will, when this tips down over the front edges of the chains, give a push to the shell or the like, to ensure that the shell will be correctly placed in the loading tray.

When the crank has been turned one turn and the step and depositing has been carried out, the magnet 36 will prevent actuation of the crank a further turn until an all-clear signal has been received that the loading system in front of the loading table is ready to receive a further shell. The all-clear signal actuates the magnet 36 and the crank can thereafter be actuated to deposit a new shell.

When placing new shells on the loading table, the clamping bar 4 is swung out of the way, and the cassette can be lowered over the table with the number of shells to be loaded.

The invention is not limited to the embodiment shown above as an example, but can be subject to modifications within the scope of the following claims and the concept of the invention. Thus, the design of the various parts in the table can be varied and/or to a certain extent automated. The step drive mechanism can then be made automatic, instead of manual, etc.

INDUSTRIAL APPLICABILITY

The parts comprised in the new loading table consist of technically simple components which are easy to manufacture and assemble in efficient production. During manufacture, the loading table can be integrated with the artillery piece in question, but it can also easily be applied to artillery pieces already in field service.

We claim:

1. A firearm loading table for receiving a plurality of ammunition units and individually depositing said ammunition units comprising:

an endless chain supported by first and second sprockets, forming upper and lower horizontal chain segments;

a plurality of holding trough segments connected to said endless chain, and perpendicular therewith, pairs of said holding trough segments abutting each other along said upper segment to form a trough member for receiving an ammunition unit, said holding trough segments having a rear edge at the center thereof for coacting with a front edge of a section of the ammunition unit for fixing the ammunition unit against forward motion;

stop means;

a support member for holding said stop means an adjustable preselected distance from one end of said trough members to form an adjustable stop means whereby motion of an ammunition unit in a direction of said one end is restricted; and means for rotating said sprockets to incrementally move said endless chain a distance substantially equal to the distance between centers of said holding troughs, whereby said segments on said upper horizontal segment advancing towards the end of the said horizontal segment separate, releasing an ammunition unit, the rear segment of a trough pushing said released ammunition unit into a receiving plane.

2. A loading table according to claim 1, wherein a second parallel drive chain is provided, the holding trough segments at their outer edges are connected together with links to said drive chains, that the links in the respective drive chains slide on a first slide rail extending in the feeding direction of the holding troughs, and are supported by a second slide rail which is at right angles in relation to the first slide rail.

3. A loading table according to claims 1 or 2 wherein the respective drive chain can be driven via sprocket wheels with straight coaction surfaces for the links of the chain, and said sprocket wheels having coaction surfaces which provide a minimum variation in the chain tension during the driving of the respective chain.

4. A loading table according to claim 2, wherein the respective sprocket wheel is heptagonal, providing an unsymmetrical cross-section of the sprocket wheel, whereby as an upper corner approaches a maximum height a lower corner leaves its minimum height and the tendency to stretch the chain at the upper corner is counteracted by a slackening of the chain at the lowr corner.

5. A loading table according to claim 1, wherein the holding trough segments are unsymmetrical in relation to each other, and in a pair of segments which form a holding trough the cross-section of the holding trough in the front holding trough segment in the feeding direction of the holding trough has an arc length which exceeds the arc length of the complementary rear holding trough segment, and said front holding trough segment urges said ammunition unit into a receiving station, and the rear holding trough segment positions the ammunition unit at the side of the table by a push actuation of the unit if said unit is not laid straight on the table 6. A loading table according to claim 1, further comprising, a rotatably supported clamping bar which in its first end position is turned down over the holding troughs to prevent any ammunition units from moving upwards, and which in a second end position uncovers the holding troughs for receiving new ammunition units.

7. A loading table according to claim 1, wherein each holding trough extends up around the ammunition unit at a front guide means or bourrelet existing on the ammunition unit, and the holding trough is recessed under the center line of the ammunition unit along its sides to form side recesses which permit receiving of ammunition units in the holding troughs;

cassette means for supplying ammunition units;

a loading tray for receiving said ammunition units located at the side of the table which has extending lips which extend into the side recesses to receive the ammunition unit.

8. The loading table of claim 1 wherein said means for rotating said sprockets to incrementally move said endless chain comprises:

a hand operated crank, means for coupling said crank to one of said sprockets, said means for coupling in response to one revolution of said crank advancing said endless chain said distance equal to the distance between centers of said holding troughs.

* * * * *